Dec. 1, 1964 E. TAUTNER ETAL 3,159,795
TRANSMISSION APPARATUS HAVING A CHECKING DEVICE
Filed Sept. 29, 1960
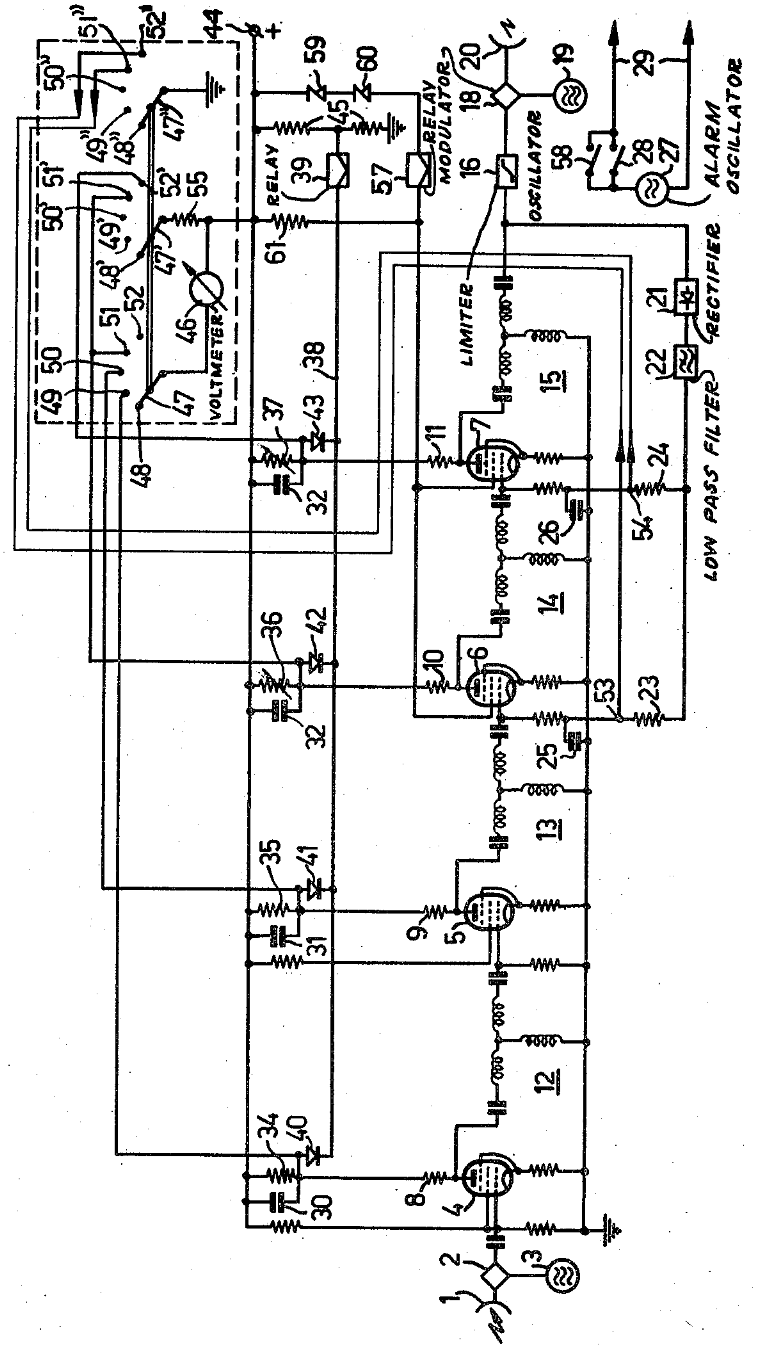
INVENTOR
Erwin Tautner.
Dorus G. Kerker.
BY
Frank R. Trifari
AGENT 3,159,795

TRANSMISSION APPARATUS HAVING A CHECKING DEVICE

Erwin Tautner and Dorus Gerardus Kerker, Hilversum, Netherlands, assignors to North American Philips Company, Inc., New York, N.Y., a corporation of Delaware Filed Sept. 29, 1960, Ser. No. 59,216
Claims priority, application Netherlands Oct. 8, 1959
5 Claims. (Cl. 330—2)

This invention relates to a transmission apparatus having a checking circuit for checking the amplifier tubes present in the transmission apparatus. Separate resistors are connected in the anode current circuit of the tubes. These resistors are connected, by way of separate biased diodes, to the lead and an indication instrument. The diodes are normally cut off, but are released if the voltage across the resistor in question passes a limiting value determined by the diode bias voltage. The indicating instrument may be constructed in various manners, for example as a voltmeter or relay circuit which on responding energizes an alarm device and the like.

Such checking circuits in transmission apparatus, for example, amplifier stations in beam transmitter communications, present considerable advantages for practical purposes, since they permit the immediate indication of any deviation from the normal operating condition in an amplifier station and the removal of the cause thereof as early as possible, so that the chance of disturbances is reduced considerably. However, it has appeared to applicants that, when using such checking circuits in a transmission apparatus provided with an AVC-device for automatic volume control of the amplifier tubes, practical objections are experienced.

The object of the invention is to provide, in a transmission apparatus of the type as mentioned above provided with an AVC-device for automatic volume control, a simple and reliable checking circuit in which the said practical objections are avoided.

According to the invention, the resistors connected to amplifier tubes, at which a variable bias voltage serving for amplification control is set up, are current-dependent resistors, the value of which decreases with increasing anode current.

In order that the invention may be readily carried into effect, it will now be described, by way of example, with reference to the accompanying drawing.

The figure shows an amplifier station for beam transmitter communication, the station being provided with a checking circuit according to the invention.

The amplifier station shown in the figure is for frequency modulation transmission in the 4000 mc./s.-band of, for example, 960 speech channels or a television signal having a band-width of approximately 5 mc./s.

In the amplifier station shown, the signals in the 4000 mc./s.-band are converted to the 70 mc./s.-band in a mixer stage 2 connected to a local oscillator 3 and then amplified in an amplifier cascade having four amplification stages which are of substantially identical construction. Each of the amplifier stages is provided with a pentode 4, 5, 6, 7, load impedance means such as an anode resistor 8, 9, 10, 11 and a transmission network 12, 13, 14, 15 composed of inductors and connected to the anode circuit.

The frequency-modulated signals in the 70 mc./s.-band amplified in the output circuit of the amplifier cascade are converted back, for the further transmission in a transmitter modulator 18 connected to a local oscillator 19, to the 4000 mc./s.-band, after limitation in a limiter 16, and transmitted by a transmitting aerial 20.

In order to obtain a constant input level for the limiter 16, an AVC-circuit, comprising rectifier 21 and a low-pass filter 22 for producing an AVC-voltage of negative polarity, is connected to the output circuit of the amplifier cascade 4, 5, 6, 7. The AVC-circuit effects the desired AVC in known manner by operation-point shifting of the pentodes 6, 7. The AVC-voltage is supplied to the control grids of the amplifier tubes 6 and 7 via series resistors 23 and 24 which are decoupled by capacitors 25 and 26. For completeness' sake it is noted that for simplification of the figure only two amplifier stages without and two amplifier stages with AVC are shown.

The amplifier station comprises a checking circuit for the amplifier tubes 4, 5, 6, 7 in the amplifier station, and an alarm oscillator 27 which may be employed in the checking circuit. The alarm oscillator 27 may be connected to the alarm lead 29 for remote control, for example from a terminal station, by means of a switch 28.

The checking circuit is provided with resistors 34, 35, 36, 37 respectively decoupled in the anode circuit of each of the pentodes 4, 5, 6, 7 respectively by capacitors 30, 31, 32, 33 respectively. These resistors are connected to an indication instrument in the form of a relay 39 by means of biased diode 40, 41, 42, 43 connected between each of the decoupled resistors 34, 35, 36, 37 respectively and the same lead 38. Bias voltages for the diodes are derived from a potentiometer 45 connected between the positive terminal 44 of the supply voltage source and ground. The bias voltages may be, for example, approximately 1.4 v. The switch 28 which connects the alarm oscillator 27 to the alarm lead 29 may be a make contact of the relay 39.

In the normal operating condition of the amplifier station, a voltage appears across the resistors 34, 35, 36, 37. This voltage is higher than the diode bias voltage so that the diodes 40, 41, 42, 43 are cut off. Consequently, no current flows through the relay 39 and the contact 28 is opened. If, however, in the case of tube failure, for example of pentode 5, the voltage across the resistor 35 associated with this tube falls below the diode bias voltage of 1.4 v., the diode 41 will become conductive and current will flow through the resistor 35, diode 41, relay 39, and potentiometer 45. The relay 39 will thus be energized, the make contact 28 will close and an alarm signal will be transmitted to the terminal station via the alarm lead 29.

In the described amplifier station provided with the pentodes 6 and 7 controlled by the AVC-voltage, applicants have found that a correct operation of the control device can not be combined with optimal transmission conditions of the amplifier station, since the anode currents of the pentodes 6 and 7 vary with the AVC-voltage and prevent the occurrence of an alarm signal indicating failure of the AVC controlled tubes 6 and 7 when they are operating within the AVC control range, the voltage across the resistors 36 and 37 at minimum anode current of the pentodes 6 and 7, for example approximately 1.5 ma., should still have a value higher than the diode bias voltage of 1.4 v. This value in the embodiment illustrated may be approximately 2 v. However, for correct operation of the checking circuit, this requirement results in a voltage drop of 30 to 40 v. across the resistors 36 and 37 at maximum anode current of the pentodes 6 and 7, for example approximately 25 ma. For optimum transmission conditions of the amplifier station this voltage drop is unduly high, and an undesirably high cut-off voltage is impressed upon the diodes 42 and 43.

According to the invention, the difficulties described above are avoided by employing current-depending resistors for resistors 36 and 37 of each of the amplifier tubes 6 and 7 controlled by the AVC-voltage. The value of the current-dependent resistors decreases with increasing anode current. The resistors 34 and 35 of the amplifier tubes 4 and 5 not controlled by the AVC-control voltage are not current-dependent resistors.

If in this circuit the anode current of the pentodes 6 and 7 changes as a result of the AVC, the value of the current-dependent resistors 36 and 37 will vary in the opposite sense, as a result of which the voltage across the resistors 36 and 37 remains constant practically at 2 v. throughout the whole AVC-range in which the anode current of the tubes 6 and 7 varies between 1.5 ma. and 25 ma. If the anode current of the pentodes 6 and 7 falls below 1.5 ma. as a result of tube failure, the measuring voltage at the resistors 36, 37 will also start to fall so as to cause energization of the relay 39 in the case of a decrease below the diode bias voltage of 1.4 v., as a result of which an alarm signal is transmitted to the terminal station.

In the case of the pentodes 4, 5 not controlled by the AVC-voltage on the contrary, the voltage across the resistors 34, 35 will vary in direct proportion to the anode current and in this case also energization of the relay will be caused in the case of a fall of the voltage below 1.4 v.

With a surprising simplicity in construction, together with a correct operation of the control device, optimum transmission conditions are realized for the amplifier station. These advantages, as has appeared from practical tests, are maintained under greatly varying operating conditions.

For the individual checking of the amplifier tubes 4, 5, 6, 7, present in the amplifier station, for example for rapidly tracing a tube failure, or for routine testing, the amplifier station is provided with a voltmeter 46 which may be connected in parallel with the resistors 34, 35, 36, 37 by means of a switch 47 with a rest contact 48 and contacts 49, 50, 51, 52 connected to said measuring resistors 34, 35, 36, 37. If the switch 47 is switched from the rest contact 48 to the contacts 49 and 50 respectively, the voltmeter 46 immediately shows the voltage across the resistors 34 and 35 respectively, as a result of which a direct indication is obtained of the operating condition of the amplifier tubes 4 and 5 respectively which are not controlled by the AVC-voltage.

The individual checking of the amplifier tubes 6 and 7 respectively which are controlled by the AVC-voltage is obtained by first connecting the grid bias voltage of the pentodes 6 and 7 respectively to a fixed potential, for example ground by means of a switch 47″ with contacts 48″, 49″, 50″, 51″, 52″, the contacts 51″ and 52″ respectively of which as is shown diagrammatically in the figure, are connected to points 53 and 54 respectively of the grid lead of the pentodes 6 and 7 respectively. The connection to ground of the points 53 and 54 respectively of the grid lead of the tubes 6 and 7 respectively is not objectionable for the satisfactory operation of the amplifier station, the AVC of the tubes 6 and 7 respectively being taken over by the other AVC-controlled amplifier tubes.

At the same time, for the individual checking of the amplifier tubes 6 and 7 respectively which are controlled by the AVC-voltage, the current-dependent resistors 36 and 37 should be converted to current-independent resistors. This object is achieved by the parallel combination of the current-dependent resistors 36 and 37 and a current-independent resistor 55 by means of a switch 47 provided with contacts 48′, 49′, 50′, 51′, 52′, the contacts 51′ and 52′ of which are connected to the resistors 36 and 37. By connecting the current-independent resistor 55, for example 77.5Ω, in parallel with the current-dependent resistors 36 and 37 respectively, a large part of the anode current of the pentodes 6 and 7 respectively is conducted via the current-independent resistor 55, as a result of which the current-dependent resistors 36 and 37 assume a very high value, for example 1000Ω so that the parallel-combination of resistor 55 with the resistors 36 and 37 respectively is substantially current-independent.

If in this manner the switch 47′ and the switch 47″ are switched to contacts 51′ and 51″, the pentode 6 has obtained a current-independent resistance, as well as a fixed grid potential, and the voltage across the voltmeter 46, when switching the switch 47 to the contact 51, gives an indication of the ageing condition of the pentode 6 controlled by the AVC-voltage. The ageing condition of the pentode 7 is checked also by switching the switches 47, 47′, 47″ to the contacts 51, 51′, 51″.

For rapid individual checking of the amplifier tubes 4, 5, 6, 7 present in the amplifier station, the switches 47, 47′, 47″ may advantageously be coupled together mechanically; in the common switching of the switches 47, 47′, 47″ to the contacts 49, 49′, 49″; 50, 50′, 50″; 51, 51′, 51″; 52, 52′, 52″, the condition of the amplifier tubes 4, 5, 6, 7 will successively be checked. Without interruption of the operation, a rapid checking of the individual amplifier tubes 4, 5, 6, 7 is obtained in a simple manner.

In order to check in the devices described whether the signal received still has a strength sufficient for a satisfactory manipulation in the amplifier station and to switch over to another connection if this strength is not sufficient, the screen grids of the amplifier tubes 6 and 7 controlled by the AVC-voltage are both connected, via a supply lead 56, to the positive terminal 44 of the supply voltage source. An alarm relay 57 is connected in this supply lead 56 comprising a make contact 58 connected in parallel to the make contact 28 of the relay 39. The screen grid current of the AVC-controlled amplifier tubes 6 and 7 is determined by the AVC-voltage and consequently by the strength of the signals received.

It is desired in this circuit that at 35 db fading the alarm relay 57 will be energized to initiate an alarm signal from the alarm oscillator 27 to be transmitted to the terminal station by closing the rest contact 58, while in the case of decrease of the fading to 25 db the alarm relay 57 should be released for disconnecting the alarm oscillator 27 from the alarm lead 29.

To realize this object with a given alarm relay 57 of a definite response current and release current, the relay 57 is connected to the positive terminal 47 of the supply voltage source via a constant voltage source in the form of series-connected Zener diodes 59, 60. The series-combination of Zener diodes 59, 60 and relay 57 is shunted by a resistor 61. With suitable proportioning of resistors 61 and the constant voltage source 59, 60, it is achieved that the relay 57 responds at 35 db fading and is energized again at a subsequent decrease of the fading to 25 db.

In the realized embodiment in which five amplifier tubes were used controlled by the AVC-voltage and the response current and the release current of the relay 57 amount to 4 and 2.5 ma. respectively and the total screen grid current amounts to 17.0 ma. at 35 db fading and 12.9 ma. at 25 db fading, the value of the resistor 61 is 2200 Ω and the constant voltage source 59, 60 is 6.5 v.

In this manner, a remote control of the amplifier tubes 4, 5, 6, 7, an individual check of the amplifier tubes, and a checking of the signal strength, that is to say, a complete checking of the amplifier station is obtained according to the invention without mutual influencing.

It is still noted that instead of connecting the resistors in the anode circuits, they may also be connected in the cathode circuits of the amplifier tubes. The characterizing feature always is that the measuring resistors conduct the anode current.

What is claimed is:

1. An amplifier system comprising a plurality of interconnected electron discharge devices having cathode, grid, and anode electrodes, a source of operating voltage, means applying said operating voltage between the anode electrodes and cathode electrodes of said devices, a resistor and load impedance means connected in the anode current circuit of each of said devices whereby anode current flows in the respective load impedance means and resistor, a source of a volume control voltage, means applying said volume control voltage between the grid electrode and cathode electrode of at least one device, separate diode means each having one electrode connected to one end of a separate said resistor, means interconnecting the other electrodes of said diode means to form a common junction, means for applying a bias voltage to said common junction, whereby the voltage across said diode means is dependent upon the anode current of the respective device, said diode means being poled to pass current only when the voltage drop across the respective resistor is below a predetermined amplitude, indicating means and means connecting said indicating means between said junction and said means applying said bias voltage whereby an indication is provided of current flow below a predetermined magnitude in any of said resistors, said resistor in the anode circuit of said device controlled by said control voltage being a current-dependent resistor having a resistance that decreases with increases in anode current.

2. An amplifier system comprising a plurality of cascade connected electron discharge devices having cathode, grid and anode electrodes, a source of operating voltage having first and second terminals, means connecting said first terminal to each of said anode electrodes comprising a separate resistor and load impedance means serially connected in that order between said first terminal and the anode of each said device, means connecting said second terminal to each of said cathode electrodes, means for deriving a volume control voltage from the last discharge device of said amplifier system, means applying said control voltage to the grid of at least one of said devices, separate diode means having their anode electrodes connected to the end of said resistors connected to said load impedance means, means interconnecting the cathode electrodes of said diode means to form a common junction, a voltage divider connected between said first and second terminals, and indicating means connected between a tap on said divider and said junction whereby said diode means are biased to a normally nonconductive state but become conductive when the voltage across the respective resistor drops below a predetermined magnitude, said resistor in the anode circuit of each device having said control voltage applied to the grid electrode being a current-dependent resistor having a resistance that decreases with increases in anode current.

3. The system of claim 2 comprising means for separately checking said devices, said checking means comprising voltmeter means, means for selectively connecting said voltmeter means across said resistors, means for selectively connecting a current-independent resistor in parallel with resistors that are current-dependent, and means for selectively applying a fixed bias to devices controlled by said control voltage.

4. The system of claim 2 in which said devices have screen electrodes, a source of constant voltage, second indicating means, and means connecting said second indicating means between said constant voltage source and the screen electrodes of said devices having said control voltage applied to the grid electrodes.

5. An amplifier system comprising a plurality of cascade connected pentode discharge device stages, and means for indicating anode current failure in any stage, for separately indicating the anode current of each stage, and for indicating a loss of signal, said system comprising means for controlling the volume of at least one but not all of said devices responsive to the signal output of the last said stage, load impedance means and separate resistor means serially connected in the anode circuit of each stage, the resistor means in controlled stages being current-dependent and having resistances that decrease with increasing anode current, separate diode means having their anode electrodes connected to one end of each resistor means whereby the voltage across said diode means is dependent upon the anode current of the respective discharge device stage, means interconnecting the cathode electrodes of said diode means to form a common junction, means connected to said common junction for biasing said diode means so that they are normally nonconductive but conduct when the voltage across the respective resistor means drops below a predetermined value, first indicating means connected to said junction for indicating anode current failure of any stage, voltmeter means, means for selectively connecting said voltmeter means across said resistors, means for selectively connecting current-independent resistors across said current-dependent resistors, means for selectively applying a constant bias to said controlled stages, a source of constant voltage, and second indicator means connecting said source of constant voltage to the screen electrodes of the controlled stages for indicating a loss of signal.

References Cited in the file of this patent

UNITED STATES PATENTS

| | | |
|---|---|---|
| 1,616,156 | Vroom | Feb. 1, 1927 |
| 1,668,748 | Whiting et al. | May 8, 1928 |
| 2,679,554 | Hurford | May 25, 1954 |
| 2,961,607 | Hunt | Nov. 22, 1960 |